(12) United States Patent
Galda et al.

(10) Patent No.: US 8,374,262 B2
(45) Date of Patent: Feb. 12, 2013

(54) METHOD AND DEVICE FOR DETERMINING AN UNABBREVIATED CHANNEL-IMPULSE RESPONSE IN AN OFDM TRANSMISSION SYSTEM

(75) Inventors: Dirk Galda, Haar (DE); Kurt Schmidt, Grafing (DE); Christoph Balz, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 835 days.

(21) Appl. No.: 12/518,678

(22) PCT Filed: Feb. 15, 2008

(86) PCT No.: PCT/EP2008/001178
§ 371 (c)(1),
(2), (4) Date: Jun. 11, 2009

(87) PCT Pub. No.: WO2008/116534
PCT Pub. Date: Oct. 2, 2008

(65) Prior Publication Data
US 2010/0118993 A1    May 13, 2010

(30) Foreign Application Priority Data

Mar. 26, 2007 (DE) .......................... 10 2007 014 385
May 23, 2007 (DE) .......................... 10 2007 023 881

(51) Int. Cl.
*H04K 1/10* (2006.01)
*H04L 27/28* (2006.01)
(52) U.S. Cl. ....................................... 375/260; 375/259
(58) Field of Classification Search .................. 375/260
See application file for complete search history.

(56) References Cited

U.S. PATENT DOCUMENTS

| | | | |
|---|---|---|---|
| 7,567,634 B1 * | 7/2009 | Lou et al. | 375/341 |
| 2002/0181509 A1 * | 12/2002 | Mody et al. | 370/480 |
| 2003/0076777 A1 * | 4/2003 | Stuber et al. | 370/206 |
| 2004/0184399 A1 * | 9/2004 | Chiou | 370/206 |
| 2005/0135324 A1 | 6/2005 | Kim et al. | |
| 2006/0239177 A1 | 10/2006 | Mazet et al. | |
| 2007/0053452 A1 * | 3/2007 | Koo et al. | 375/260 |
| 2007/0140323 A1 * | 6/2007 | Patel et al. | 375/149 |

FOREIGN PATENT DOCUMENTS

| | | |
|---|---|---|
| DE | 10005287 A1 | 8/2001 |
| EP | 1748610 A1 | 1/2007 |

OTHER PUBLICATIONS

International Search Report, WO 2008/116534 A1, Jun. 26, 2008, pp. 25-30.

(Continued)

*Primary Examiner* — Erin File
(74) *Attorney, Agent, or Firm* — Ditthavong Mori & Steiner, P.C.

(57) ABSTRACT

A method and a device for determining an unabbreviated channel-impulse response in an OFDM transmission system, of which the duration is greater than the length of the guard interval, estimates the channel-transmission factor at frequency-time positions of a relatively-coarse frequency-time raster, interpolates the channel-transmission factor at frequency-time positions of a relatively-fine frequency-time raster and calculates the unabbreviated channel-impulse response by means of inverse Fourier transform from the estimated or interpolated values of the channel-transmission factor at the frequency-time positions of the relatively-fine frequency-time raster. In this context, estimated values of the channel-transmission factor optimized at the individual frequency-time positions of the relatively-fine frequency-time raster are determined from received symbols and from transmitted symbols estimated by means of decision from the received symbols.

12 Claims, 3 Drawing Sheets

OTHER PUBLICATIONS

Vittoria Mignone et al. "CD3-OFDM: A Novel Demodulation Scheme for Fixed and Mobile Receivers," IEEE Transactions on Communications, vol. 44, No. 9, Sep. 1996, pp. 1-8.

International Preliminary Report on Patentability, PCT/EP2008/001178, Jan. 21, 2010, pp. 1-6.

* cited by examiner

METHOD AND DEVICE FOR DETERMINING AN UNABBREVIATED CHANNEL-IMPULSE RESPONSE IN AN OFDM TRANSMISSION SYSTEM

CROSS-REFERENCE TO RELATED APPLICATION

The present application is a national phase application of PCT Application No. PCT/EP2008/001178, filed on Feb. 15, 2008, and claims priority to German Application No. DE 10 2007 014 385.2, filed on Mar. 26, 2007, and German Application No. DE 10 2007 023 881.0, filed on May 23, 2007, the entire contents of which are herein incorporated by reference.

BACKGROUND OF THE INVENTION

1. Field of the Invention

The invention relates to a method and a device for determining an unabbreviated channel-impulse response in an OFDM transmission system.

2. Discussion of the Background

Cellular common-frequency networks (SFN single-frequency networks) are increasingly used in digital radio technology in order to reduce the required transmission power. In a cellular single-frequency network, an identical transmitted signal is transmitted in a time-synchronous and frequency-synchronous manner by several transmitters stationed in regionally-distributed cells. In a cellular single-frequency network, the corresponding received signal is composed from the additive superpositions of the individual transmitted signals delayed by the distance-dependent signal-delay time and convoluted with the independent channel-impulse response.

In view of the identical transmitted signals, the transmission channel in a cellular single-frequency network can therefore be characterized by a virtual channel-impulse response. The length of this virtual channel-impulse response depends upon the maximum delay-time difference between two transmitters disposed at the maximum distance from one another and the maximum alternate-routing-delay of the multi-route channel. In view of the cell size of 30 kilometers or more, which is conventional in digital radio technology, channel-impulse-response lengths of more than 100 µs can therefore occur. The virtual channel-impulse response in this context is determined by a few echo-clusters with a length of typically less than 10 µs displaced relative to one another in time, which are generally allocated in each case to one transmitter.

An accurate knowledge of the behaviour of the transmission channel is essential for the correct operation of a single-frequency network. The measurement of the transmission channel by estimation required for this purpose determines an optimum reconstruction of the virtual channel-impulse response.

In order to determine the virtual channel-impulse response, in an OFDM (Orthogonal Frequency Division Multiplex) transmission system, pilot symbols are transmitted in a given frequency-time raster of the frequency-time transmission frame composed of frequency carriers and symbol durations. Within one symbol duration of the frequency-time transmission frame, the pilot symbols to be transmitted for the determination of the channel-impulse response are arranged in a guard interval disposed before or after the useful-data interval.

So long as the duration of the virtual channel-impulse response is shorter than the length of the guard interval, the virtual channel-impulse response can be reconstructed within the guard interval without interference. The reconstruction of the useful-data symbol transmitted in the useful-data interval is also implemented without difficulty.

If the virtual channel-impulse response extends over the length of the guard interval, inter-symbol interference occurs between the pilot symbols and the useful-data symbols, which impairs the reception of the useful-data symbols and also no longer allows the reconstruction of the channel-impulse response from the transmitted pilot symbols.

According to the prior art—as disclosed, for example, in DE 100 05 287 A1—the channel estimation for the correct reconstruction of the useful-data symbols is implemented on the basis of pilot symbols as follows:

The pilot symbols are positioned according to FIG. 1A in a raster of respectively ($N_F$) frequency carriers within the transmission bandwidth consisting of a total of ($N_C$) frequency carriers. The discrete channel-transmission function ($\hat{H}_k$) of the OFDM transmission channel determined in the receiver from the pilot symbols by means of an estimator provides an impulse response (h(n)) continued periodically in the time domain with the periodicity $$\left(\frac{N_C}{N_F}\right),$$

as shown in FIG. 1B. The estimation of the channel-transmission function ($\hat{H}_k$) in the frequency carriers not occupied by pilot symbols is implemented according to FIG. 1C by interpolation from the estimated values of the channel-transmission function ($\hat{H}_k$) in the frequency carriers defined with pilot symbols by means of interpolation filters. The interpolation determines a windowing or respectively band limitation of the impulse response (h(n)) in the time domain as shown in FIG. 1D at the level of the filter length ($F_I$) of the interpolation filter (grey-dotted, trapeze-shaped region in FIG. 1D).

As a prerequisite for a correct reconstruction of the channel-impulse response, the duration of the channel-impulse response must be kept smaller than the period of the periodically-continued individual channel-impulse responses by appropriate dimensioning of the frequency raster ($N_F$) of the pilot symbols in order to prevent an aliasing between the individual periodically-continued channel-impulse responses. For this purpose, the ratio of the frequency raster ($N_F$) of the pilot symbols relative to the system-bandwidth ($N_C$) of the OFDM transmission channel must be designed to be larger than the length ($N_G$) of the guard interval as shown in equation (1).

$$N_G \leq \frac{N_C}{N_F} \qquad (1)$$

Moreover, the filter length ($F_I$) of the interpolation filter should be designed in such a manner that the periodic continuations of the channel-impulse response are suppressed. The filter length ($F_I$) of the interpolation filter must therefore be designed to be smaller than the ratio of the frequency raster ($N_F$) of the pilot symbol relative to the system bandwidth ($N_C$) of the OFDM transmission channel.

If the channel-impulse response provides a relatively-shorter duration than the filter length $F_I$ of the interpolation filter, the channel-impulse response can be correctly reconstructed according to FIG. 1D.

However, if, as illustrated in FIG. 1E, the duration of the channel-impulse response is longer than the selected filter length $F_I$ of the interpolation filter, part of the channel-impulse response is suppressed by the band limitation of the interpolation. In this case, a correct reconstruction of the channel-impulse response is not possible.

In order to remove the negative influence of the band limitation of the interpolation filter on the reconstruction of the channel-impulse response, the interpolation is conventionally replaced by a more-complex channel estimation by means of pilot symbols in a relatively-fine frequency raster. With an estimation of the channel-transmission frequency in the frequency domain by means of pilot symbols relatively-finer by the factor Q (factor Q<1) according to FIG. 2A, the period of the periodically-continued channel-impulse response is increased in the time domain by the same factor Q as shown in FIG. 2B. Consequently, the duration of the channel-impulse response can be prolonged by this factor Q, without causing a faulty reconstruction. If the duration $N_G$ of the guard interval in FIG. 2A has not changed relative to the situation in FIG. 1B or respectively 1D and 1E, the channel-impulse response $\hat{h}$ according to equation (2) can be reconstructed in an error-free manner through an inverse Fourier transform from the estimated channel-transmission function $\hat{H}$, even if the duration of the channel-impulse response $\hat{h}$ extends beyond the length $N_G$ of the guard interval.

$$\hat{h}=F^{-1}\{\hat{H}\} \quad (2)$$

However, an error-free reconstruction of a channel-impulse response, the duration of which extends over the entire symbol duration, presupposes a definition of each of the $N_C$ frequency carriers with pilot symbols. Since useful-data symbols can no longer be transmitted in this manner, a procedure of this kind cannot be used in practice with a channel-impulse response with a very long duration to be reconstructed.

While a faulty reconstruction of the channel-impulse response is avoidable for the current operation of an OFDM transmission system through an appropriate choice of the frequency raster $N_F$ of the pilot symbols and through an appropriate choice of the filter length $F_I$ of the interpolation filter, for the testing of mobile-telephone networks, in which there is no possibility of adapting the frequency raster $N_F$ of the pilot symbols and the filter length $F_I$ of the interpolation filter in current network operation, it must also be possible to reconstruct the channel-impulse response correctly as presented in FIG. 1E.

With measurements during network operation of the cellular single-frequency network, for example, it is possible to check from the correctly-reconstructed virtual channel-impulse response, whether the maximal delay-time difference of the associated transmitted signals determined by the maximal regional distance between two transmitters of the cellular single-frequency network is disposed within the maximum length of the channel-impulse response capable of being processed by the receiver. Moreover, the individual echoes associated with the transmitter can be identified from the correctly-reconstructed virtual channel-impulse response and, the frequency synchronisation of the individual transmitters can be monitored from the Doppler shift of the echoes associated with the individual transmitters.

SUMMARY OF THE INVENTION

Embodiments of the invention therefore advantageously provide a method and a device for the correct determination of the virtual channel-impulse response of an OFDM transmission channel in a cellular single-frequency network, in which the duration of the virtual channel-impulse response extends beyond the filter length of the interpolation filter or respectively beyond the duration of the guard interval.

According to embodiments of the invention, the channel-transmission function determined by means of estimation and interpolation, which, under some circumstances, provides an abbreviated channel-impulse response as a result of the interpolation, is optimized by a new determination on the basis of the symbols received at the individual frequency-time positions and the transmitted symbols estimated from the received symbols by means of decision. Subject to the condition that the estimation leads to the symbol actually transmitted at the respective frequency-time position, the correct channel-transmission function is determined at the respective frequency-time position. By contrast with the channel-transmission function determined by means of estimation and interpolation, the channel-transmission function optimized in this manner provides, a channel-impulse response with a complete length, which can extend not only over the filter length of the interpolation filter, but also over the duration of the guard interval—in an extreme case, over the entire symbol duration.

The correctness of the estimation of the symbol transmitted at the respective frequency-time position can be improved by implementing an equalization of the symbol received at the respective frequency-time position, which is distorted in the transmission channel, before the estimation of the transmitted symbol with the inverse channel-transmission function determined from estimation and interpolation.

The decision of the symbol transmitted at the respective frequency-time position can be additionally optimized by implementing, in series with a first "hard decision"—direct recovery of the transmitted bit sequence from the received symbols, for example, by minimizing the Euclidean distance between the received symbol and all symbols of the symbol alphabet associated with the modulation method used in the constellation diagram—a second "soft decision"—providing reliability or probability values of the transmitted bit sequence—optimising the first "hard decision". Optimized estimated values for the transmitted bit sequence can be determined from "hard bits" and reliability values in a re-modulation by combining a "hard decision" with a "soft decision".

BRIEF DESCRIPTION OF THE DRAWINGS

The method according to the invention and the device according to the invention for determining an unabbreviated channel-impulse response in an OFDM transmission system is explained in detail below with reference to the drawings. The drawings are as follows.

DETAILED DESCRIPTION OF EXEMPLARY EMBODIMENTS OF THE INVENTION

Figure 1A:
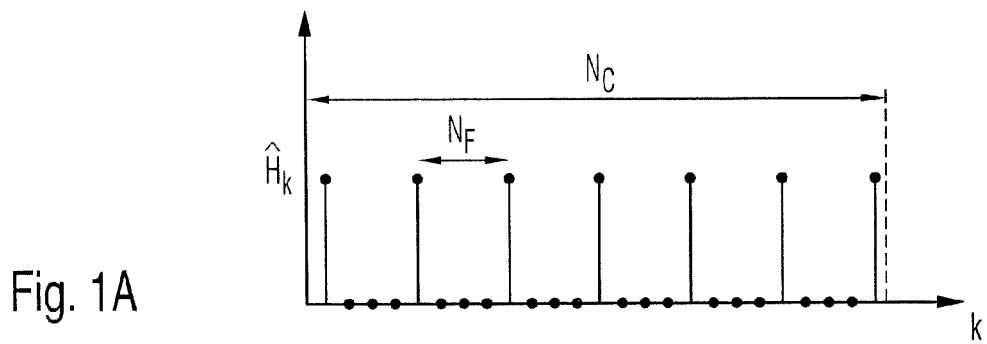
FIGS. 1A, 1B show a frequency diagram of a channel-transmission function estimated by means of pilot symbols and a time-flow diagram of the associated channel-impulse response.
Figure 1B:
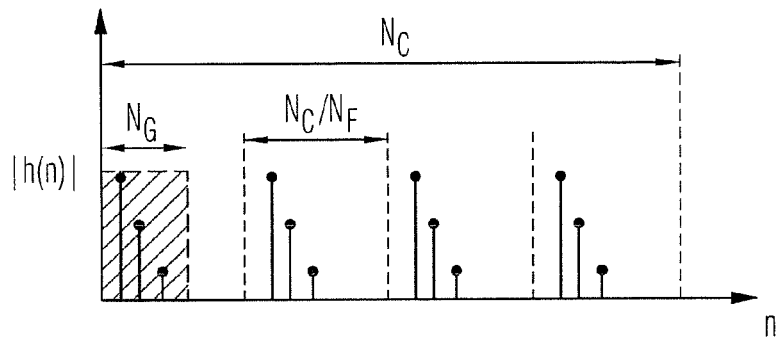
Figure 1C:
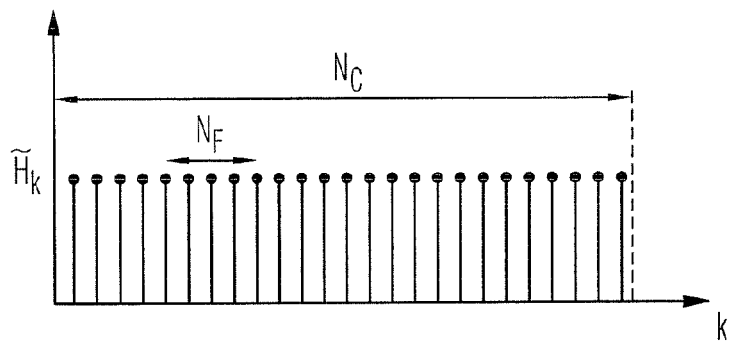
FIGS. 1C, 1D show a frequency diagram of an estimated and interpolated channel-transmission function and a time-flow diagram of the associated channel-impulse response.
Figure 1D:
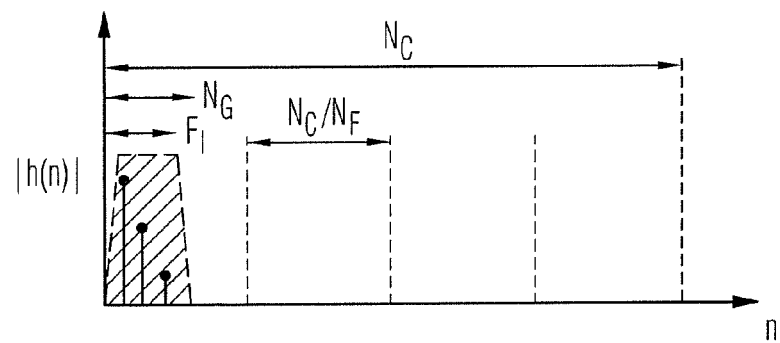
Figure 1E:
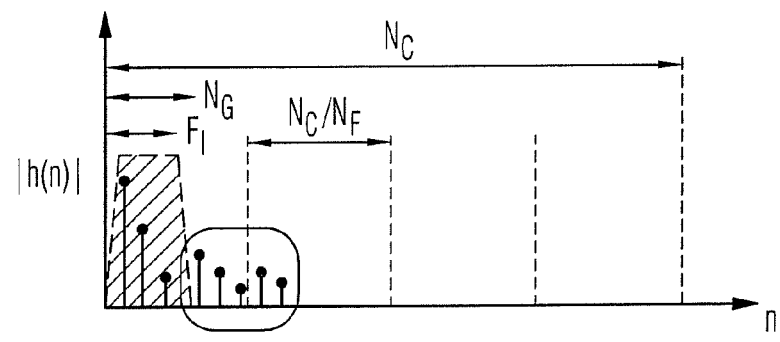
FIG. 1E shows a time-flow diagram of the channel-impulse response band-limited by means of interpolation.
Figure 2A:
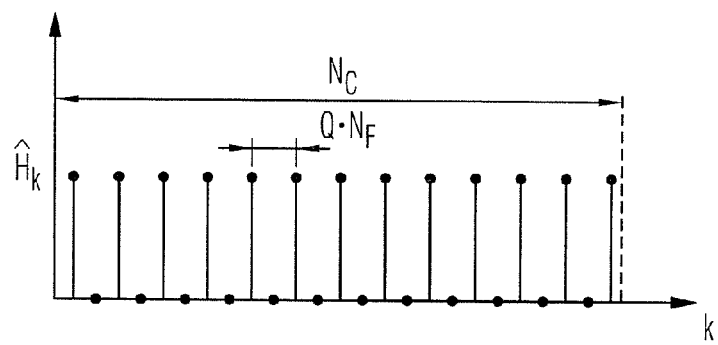
FIGS. 2A, 2B show a frequency diagram of a channel-transmission function estimated by means of pilot symbols in a relatively-fine frequency raster and a time-flow diagram of the associated channel-impulse response.
Figure 2B:
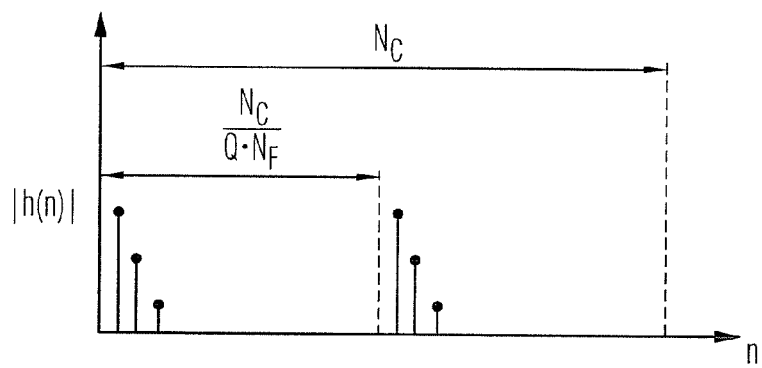

Before the device according to the invention and the method according to the invention for determining an abbreviated channel-impulse response in an OFDM transmission system are explained in detail with reference to FIGS. 3 and 4, the mathematical bases required for an understanding of the invention are derived in the following section.

At the transmitter end of an OFDM transmission system, the n-th complex-value OFDM transmitted symbol in the k-th frequency carrier is transformed according to equation (3) by means of Fourier transform into a first sampled value of the complex-value signal to be transmitted sn,l, before it is mixed into the high-frequency band.

$$s_{n,l} = \frac{1}{\sqrt{N_C}} \cdot \sum_{k=0}^{N_C-1} S_{n,k} \cdot e^{j2\pi k l/N_C} \quad (3)$$

$$l = -N_G, \ldots, N_C - 1$$

In this context, the useful-data symbols can be taken from the symbol alphabet of an M-value coherent (M-QAM, M-(A)PSK) or an M-value differential (M-D(A)PSK) modulation method. The individual transmitted symbols $S_{n,k}$ in this context are scaled with regard to their signal power to the value $\sigma_S^2$. Alongside the useful-data symbols, within a given frequency-time raster, pilot symbols are scattered into the individual frequency carriers and symbol intervals. The pilot symbols are modulated in a lower-value modulation method—typically PSK modulation—and, by comparison with the useful-data symbols, provide a relatively-higher mean-signal power.

During the transmission via the OFDM transmission channel, a convolution of the transmitted signal s(t) with the channel-impulse response h(t) of the OFDM transmission channel and an additive superposition with a Gaussian, white, uncorrelated channel noise (AWGN) n(t) with noise power $\sigma_N^2$ is implemented, so that the received signal r(t) is obtained according to equation (4).

$$r(t) = s(t) * h(t) + n(t) \quad (4)$$

After the guard interval added to the transmitted signal in the transmitter has been removed from the received signal r(t) in the receiver, and the received signal has been transformed into the frequency domain, starting from equation (4), the relationship for the complex-value received signal $R_{n,k}$ presented in equation (5) is obtained:

$$R_{n,k} = H_{n,k} \cdot S_{n,k} + N_{n,k} \quad (5)$$

In this context, the transmission factor $H_{n,k}$ of the channel-transmission function in the n-th symbol interval and k-th frequency carrier is obtained according to equation (6) by Fourier transform of the virtual channel-impulse response $h(\tau, n \cdot T_S)$:

$$H_{n,k} = \sum_{k=0}^{N_C-1} h(\tau, n \cdot T_S) \cdot e^{-j2\pi k n/N_C} \quad (6)$$

In this context, $\tau$ denotes the mean signal-delay time of the OFDM transmission system in the cellular single-frequency network and $T_S$ denotes the symbol interval composed according to equation (7) from the useful-data interval T and the guard interval $T_G$.

$$T_S = T + T_G \quad (7)$$

The virtual channel-impulse response $h(\tau, n \cdot T_S)$ is once again obtained according to equation (8) by superposing the path weights $h_{p,m}(n \cdot T_S)$ and the associated path-delay times $\tau_{p,m}$ of the total of $N_m^P$ discrete echo paths from all $N_T$ transmitters:

$$h(\tau, n \cdot T_S) = \sum_{m=0}^{N_T-1} \sum_{p=0}^{N_m^P-1} h_{p,m}(n \cdot T_S) \cdot \delta(n \cdot T_S - \tau_{p,m}) \quad (8)$$

The individual path weights $h_{p,m}(n \cdot T_S)$ are assumed to be constant within the individual OFDM symbol durations and are uncorrelated relative to one another. They are taken from a stationary stochastic process, which provides a time-frequency correlation function of the channel-transmission function dependent upon the transmission environment (WS-SUS-transmission channel: Wide-Sense-Stationary-Uncorrelated-Scattering transmission channel).

Within an OFDM symbol, the individual sampled values $h_{n,l}$ of the channel-impulse response, which are combined according to equation (9) in a vector $\underline{h}_n$, can be calculated according to equation (10) by means of an inverse Fourier transform from the channel-transmission factors $H_{n,k}$ the individual frequency carriers, which are combined according to equation (11) in a vector $\underline{H}_n$.

$$\underline{h}_n = [h_{n,0}, h_{n,1}, \ldots, h_{n,N_C-1}] \quad (9)$$

$$\underline{H}_n = [H_{n,0}, H_{n,1}, \ldots, H_{n,N_C-1}] \quad (10)$$

$$\underline{h}_n = F^{-1}\{\underline{H}_n\} \quad (11)$$

In this context, the Fourier matrix F with the dimension $N_C$ contains the elements Fk,l as shown in equation (12):

$$F_{k,l} = e^{-j2\pi k l/N_C} \, k, l = 0, \ldots, N_C - 1 \quad (12)$$

The acquisition of the channel-transmission factors $H_{n,k}$ the n-th symbol interval and in the k-th frequency carrier required for the determination of the l-th sampled value $h_{n,l}$ of the channel-impulse response in the n-th symbol interval is realized by means of channel estimation via pilot symbols transmitted within a given frequency-time raster. These transmitted pilot symbols $S_{n,k}$ arranged at the spacing distance of $N_F$ frequency carriers and $N_D$ symbol intervals are known to the receiver according to position within the frequency-time transmission frame and according to content. From the pilot symbols $R_{n,k}$ received in the frequency-time transmission frame, the estimated value $\hat{H}_{n,k}$ of the channel-transmission factor $H_{n,k}$ in the n-th symbol interval and in the k-th frequency carrier can be determined in the receiver from these.

Interpolated values $\tilde{H}_{n,k}$ of the channel-transmission factors $H_{n,k}$ can be determined in a relatively-fine frequency-time raster by interpolation with interpolation filters from the estimated values $\hat{H}_{n,k}$ of the channel-transmission factors $H_{n,k}$. The interpolation can be implemented in two dimensions or one dimension separated according to time and frequency direction. In order to achieve a maximum frequency-time accuracy in the determination of the channel-transmission function H, the interpolation can be implemented even within one symbol interval separately for every symbol interval and every frequency carrier. In the case of a one-dimensional interpolation in the frequency direction, the interpolated values $\tilde{H}_{n,k}$ of the channel-transmission factors $H_{n,k}$ in the n-th symbol interval are obtained from the matrix multiplication of the associated estimated values $\hat{H}_{n,k}$ of the channel-transmission factors $H_{n,k}$ in the n-th symbol interval with the elements of the Wiener filter matrix W according to equation (13):

$$\underline{\tilde{H}}_n = W \cdot \underline{\hat{H}}_n \qquad (13)$$

In this context, the interpolated values $\tilde{H}_{n,k}$ of the channel-transmission factors $H_{n,k}$ in the n-th symbol interval according to equation (14) are combined in a vector $\underline{\tilde{H}}_n$ and the estimated values $\hat{H}_{n,k}$ of the channel-transmission factors $H_{n,k}$ in the n-th symbol interval according to equation (15) are combined in a vector $\underline{\hat{H}}_n$.

$$\underline{\tilde{H}}_n = [\tilde{H}_{n,0}, \tilde{H}_{n,1}, \ldots, \tilde{H}_{n,Nc-1}] \qquad (14)$$

$$\underline{\hat{H}}_n = [\hat{H}_{n,0}, \hat{H}_{n,1}, \ldots, \hat{H}_{n,Nc-1}] \qquad (15)$$

The symbols $R_{n,k}$, received in the n-th symbol interval and k-th frequency carrier, which are distorted relative to the transmitted symbols $S_{n,k}$ on the OFDM transmission channel, are equalised with the inverse estimated values $\hat{H}_{n,k}$ or respectively interpolated values $\tilde{H}_{n,k}$ of the channel-transmission function according to equation (16).

$$\hat{D}_{n,k} = \begin{cases} \dfrac{R_{n,k}}{\hat{H}_{n,k}} \\ \dfrac{R_{n,k}}{\tilde{H}_{n,k}} \end{cases} \qquad (16)$$

A coarse estimated value $\tilde{S}_{n,k}$ of the transmitted symbol $S_{n,k}$ is estimated from the equalised received symbol $\hat{D}_{n,k}$ according to equation (16) in a "hard decision" according to equation (17), and optionally, within the framework of a re-modulation, by combining the "hard decision" with a subsequent "soft decision", for example, by means of an interleaver and a Viterbi decoder, an improved estimated value $\tilde{\tilde{S}}_{n,k}$ of the transmitted symbol $S_{n,k}$ is estimated according to equation (18).

$$\tilde{S}_{n,k} = Q_1\{\hat{D}_{n,k}\} \qquad (17)$$

$$\tilde{\tilde{S}}_{n,k} = Q_2\{\tilde{S}_{n,k}\} \qquad (18)$$

The operator $Q_1\{\bullet\}$ in this context describes the "hard decision" and the operator $Q_2\{\bullet\}$ describes the optional "soft decision".

An optimised estimated value $\tilde{\tilde{H}}_{n,k}$ of the channel-transmission factor $H_{n,k}$ in the n-th symbol interval and k-th frequency carrier is estimated in a subsequent estimator with the improved estimated value $\tilde{\tilde{S}}_{n,k}$ of the transmitted symbol $S_{n,k}$ and the associated received symbol $R_{n,k}$ to equation (19).

$$\tilde{\tilde{H}}_{n,k} = \frac{R_{n,k}}{\tilde{\tilde{S}}_{n,k}} \qquad (19)$$

The channel-transmission function with the estimated values $\tilde{\tilde{H}}_{n,k}$ optimized according to equation (19) is not band-limited by comparison with the interpolated values $\tilde{H}_{n,k}$ of the channel-transmission function $H_{n,k}$ and, in the case of a correct decision, represents a nearer-to-reality image of the OFDM transmission channel by comparison with the interpolated values $\tilde{H}_{n,k}$ of the channel-transmission function $H_{n,k}$.

Accordingly, the channel-impulse response $\tilde{\tilde{h}}_n$ calculated by means of inverse Fourier transform according to equation (20) from the optimised estimated values $\tilde{\tilde{H}}_{n,k}$ of the channel-transmission function $H_{n,k}$ can be determined in its full length.

$$\tilde{\tilde{h}}_n = F^{-1}\{\tilde{\tilde{H}}_{n,k}\} \qquad (20)$$

Figure 3:
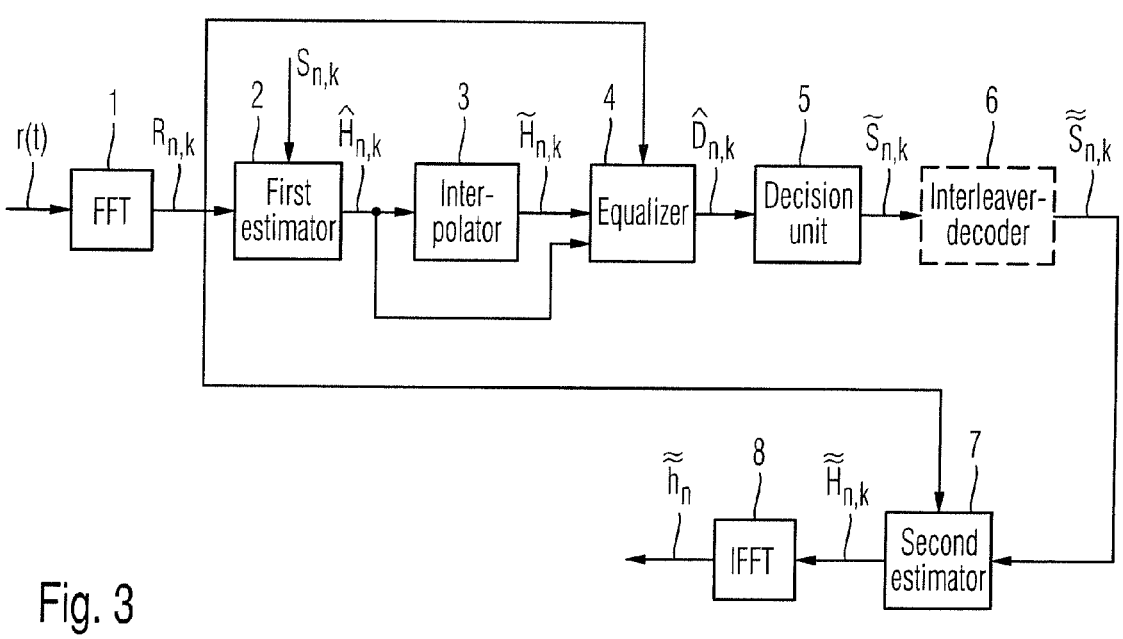
FIG. 3 shows a block-circuit diagram of a device according to the invention for determining an abbreviated channel-impulse response.

FIG. 3 presents the block-circuit diagram of the device according to the invention for determining an unabbreviated channel-impulse response in an OFDM transmission system.

The received pilot symbol $R_{n,k}$ transferred in the n-th symbol interval and in the k-th frequency carrier is determined in a Fourier transformer 1 from the received signal r(t) mixed into the intermediate-frequency or baseband. In a first estimator 2 of the receiver, an estimated value $\hat{H}_{n,k}$ of the channel-transmission factor $H_{n,k}$ in the n-th symbol interval and in the k-th frequency carrier is estimated from the received pilot symbol $R_{n,k}$ and the associated transmitted pilot symbol $S_{n,k}$ known to the receiver.

In a subsequent interpolator 3, interpolated values $\tilde{H}_{n,k}$ of the channel-transmission factor $H_{n,k}$ are calculated with reference to equation (13) from the individual estimated values $\hat{H}_{n,k}$ of the channel-transmission factor $H_{n,k}$ in a frequency-time raster finer than the frequency-time raster of the estimated values $\hat{H}_{n,k}$.

Using the estimated values $\hat{H}_{n,k}$ and the interpolated values $\tilde{H}_{n,k}$ of the channel-transmission factor $H_{n,k}$, the received useful-data or pilot symbol $R_{n,k}$ distorted on the OFDM transmission channel is equalized in a subsequent equalizer 4 according to equation (16).

A coarse estimated value $\tilde{S}_{n,k}$ of the associated transmitted symbol $S_{n,k}$ is determined from the equalised received symbol $\hat{D}_{n,k}$ according to equation (17) in a "hard decision unit" 5.

Optionally, an optimum estimated value $\tilde{\tilde{S}}_{n,k}$ of the transmitted symbol $S_{n,k}$ can be determined according to equation (18) in a subsequent "soft decision unit" 6 consisting, for example, of an interleaver and a decoder.

In a subsequent second estimator 7, an optimized estimated value $\tilde{\tilde{H}}_{n,k}$ for the channel-transmission factor $H_{n,k}$ according to equation (19) in every symbol interval n and in every frequency carrier k is determined on the basis of the received symbol $R_{n,k}$ and the optimized estimated value $\tilde{\tilde{S}}_{n,k}$ of the transmitted symbol $S_{n,k}$. Finally, the channel-impulse response $\tilde{\tilde{h}}_n$ is calculated in an inverse Fourier transformer 8 from the optimized estimated values $\tilde{\tilde{H}}_{n,k}$ for the channel-transmission factor $H_{n,k}$ according to equation (20).

Figure 4:
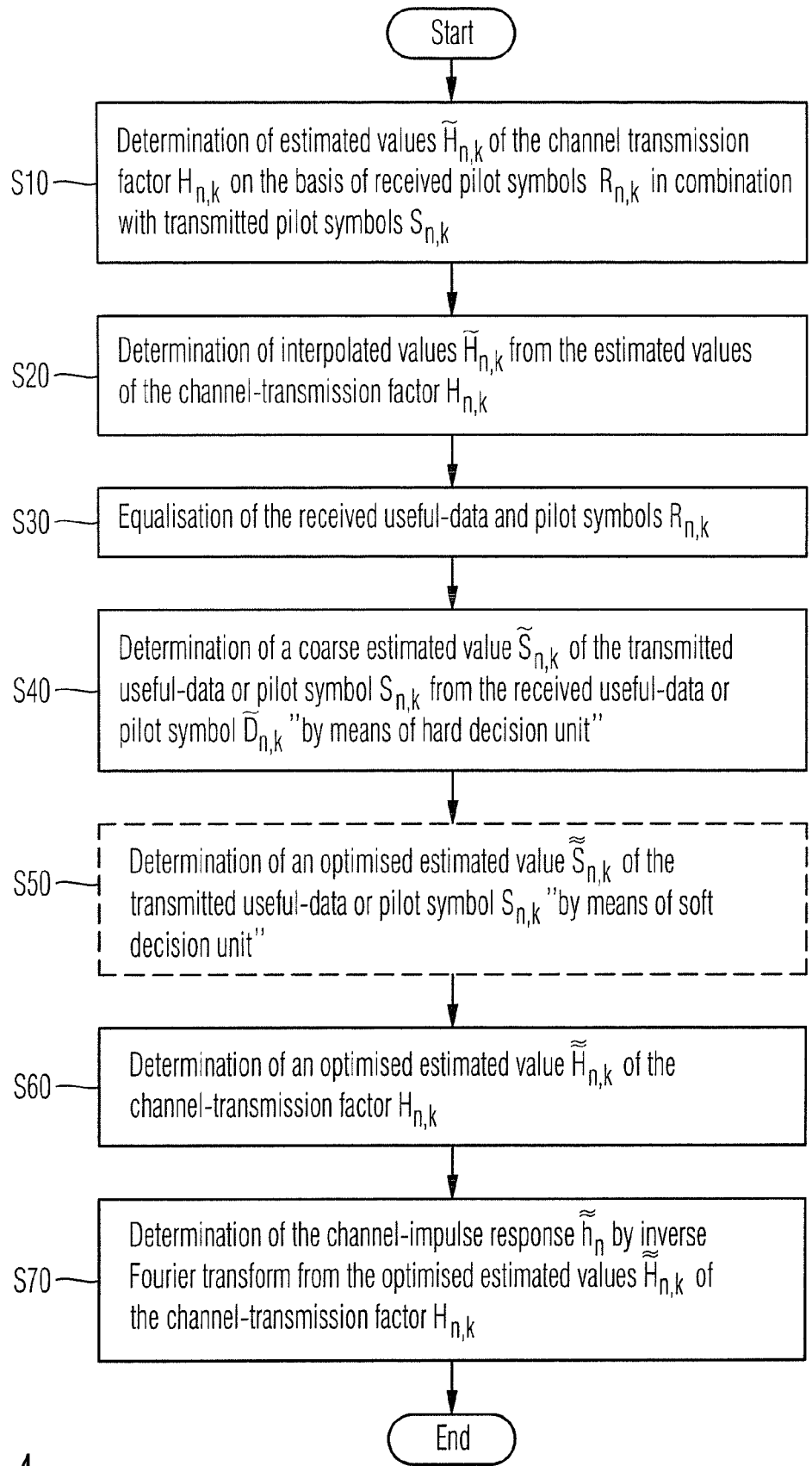
FIG. 4 shows a flow chart of a method according to the invention for determining an unabbreviated channel-impulse response.

The following section explains the method according to the invention for determining the channel-impulse response in an OFDM transmission system with reference to the flow chart in FIG. 4:

In a first procedural stage S10, estimated values $\hat{H}_{n,k}$ for the channel-transmission factor $H_{n,k}$ in the frequency-time raster of the pilot symbols are determined from the pilot symbols $R_{n,k}$ received in a given frequency-time raster and the associated transmitted pilot symbols $S_{n,k}$ known to the receiver.

In a subsequent procedural stage S20, starting from the estimated values $\hat{H}_{n,k}$ of the channel-transmission factor $H_{n,k}$ determined in procedural stage S10, using a conventional interpolation method—for example, an optimisation method with an optimization quality determined according to a minimum-mean-square-error criterion—, interpolated values $\tilde{H}_{n,k}$ of the channel-transmission factor $H_{n,k}$ are determined according to equation (13) in a frequency-time raster finer than the frequency-time raster of the pilot symbols.

The next procedural stage S30 provides the equalisation of the received useful-data or pilot symbols $R_{n,k}$ distorted on the OFDM transmission channel with the assistance of the inverse estimated values $\hat{H}_{n,k}$ and inverse interpolated values $\tilde{H}_{n,k}$ of the channel-transmission factor $H_{n,k}$ according to equation (16). The equalized received symbols $\hat{D}_{n,k}$ are used in the next procedural stage S40 in a "hard decision unit" to determine coarse estimated values $\tilde{S}_{n,k}$ for the associated transmitted useful-data or respectively pilot symbols $S_{n,k}$ according to the equation (17).

Optimized estimated values $\tilde{\tilde{S}}_{n,k}$ for the transmitted useful-data or respectively pilot symbols $S_{n,k}$ are optionally determined in the subsequent procedural stage S50 in a "soft decision unit"—for example, a Viterbi decoder—according to equation (18) starting from the coarse estimated values $\tilde{S}_{n,k}$ of the transmitted symbols $S_{n,k}$.

In the subsequent procedural stage S60, optimized estimated values $\tilde{\tilde{H}}_{n,k}$ for the respective channel-transmission factor $H_{n,k}$ are determined in a second estimator according to equation (19) from the optimised estimated values $\tilde{\tilde{S}}_{n,k}$ for the transmitted useful-data symbols or respectively pilot symbols $S_{n,k}$ and the associated received symbols $R_{n,k}$.

In the final procedural stage S70, the unabbreviated channel-impulse response $\tilde{h}_n$ is calculated from the optimized estimated values $\tilde{\tilde{H}}_{n,k}$ of the channel-transmission factor $H_{n,k}$ with the assistance of the inverse Fourier transform according to equation (20).

The invention is not restricted to the embodiment of the device according to the invention and of the method according to the invention for determining the channel-impulse response in an OFDM transmission system as presented. Alongside the illustrated method implemented in the frequency domain, the invention also covers a method in the time domain corresponding to the frequency-domain-orientated method for determining an unabbreviated channel-impulse response.

The invention claimed is:

1. A method for determining an unabbreviated channel-impulse response in an OFDM transmission system, of which a duration is greater than a length of a guard interval, comprising:
   a first estimating of a channel-transmission factor from pilot symbols received at frequency-time positions of a relatively-coarse frequency-time raster;
   interpolating the channel-transmission factor at frequency-time positions of a relatively-fine frequency-time raster;
   calculating the unabbreviated channel-impulse response with an inverse Fourier transform from the estimated or interpolated values of the channel-transmission factor at the frequency-time positions of the relatively-fine frequency-time raster;
   estimating transmitted symbols with a decision from received symbols; and
   a second estimating of optimized estimated values of the channel-transmission factor from the received symbols and the estimated transmitted symbols.

2. The method for determining the channel-impulse response according to claim 1, wherein, for the transmitted symbols estimated with a decision, the associated received symbols equalized with the estimated and interpolated values of the channel-transmission factor at the individual frequency-time positions are used.

3. The method for determining the channel-impulse response according to claim 1, wherein the decision is a hard decision.

4. The method for determining the channel-impulse response according to claim 3, wherein the hard decision is followed by a soft decision, realized as channel decoding.

5. A device for determining an unabbreviated channel-impulse response in an OFDM transmission system, of which a duration is greater than a length of a guard interval, comprising:
   a first estimator for determining estimated values of the channel-transmission factor from pilot symbols received at frequency-time positions of a relatively-coarse frequency-time raster;
   an interpolator for determining interpolated values of the channel-transmission factor at frequency-time positions of a relatively-fine frequency-time raster;
   an inverse Fourier transformer for the calculation of the unabbreviated channel-impulse response from the estimated and interpolated values of the channel-transmission factor at frequency-time positions of the relatively-fine frequency-time raster;
   a decision unit for estimating transmitted symbols from associated received symbols; and
   a second estimator for estimating optimized estimated values of the channel-transmission factor from the received symbols and the estimated transmitted symbols connected between the interpolator and the inverse Fourier transformer.

6. The device for determining the channel-impulse response according to claim 5, wherein an equalizer for equalizing the received symbols with estimated and interpolated values of the channel-transmission factor is connected between the interpolator and the decision unit.

7. The device for determining the channel-impulse response according to claim 5, wherein the decision unit is a hard decision unit.

8. The device for determining the channel-impulse response according to claim 7, wherein the hard decision unit is followed by a decoder operating as a soft decision unit.

9. The method for determining the channel-impulse response according to claim 2, wherein the decision is implemented as a hard decision.

10. The method for determining the channel-impulse response according to claim 9, wherein the hard decision is followed by a soft decision, realized as channel decoding.

11. The device for determining the channel-impulse response according to claim 6, wherein the decision unit is a hard decision unit.

12. The device for determining the channel-impulse response according to claim 11, wherein the hard decision unit is followed by a decoder operating as a soft decision unit.

* * * * *